(12) United States Patent
Saimi et al.

(10) Patent No.: US 10,240,730 B2
(45) Date of Patent: Mar. 26, 2019

(54) ILLUMINATION DEVICE (71) Applicant: PANASONIC INTELLECTUAL PROPERTY MANAGEMENT CO., LTD., Osaka (JP)

(72) Inventors: Motohiro Saimi, Hyogo (JP); Osamu Tanahashi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 76 days.

(21) Appl. No.: 15/180,321

(22) Filed: Jun. 13, 2016

(65) Prior Publication Data
US 2016/0377793 A1    Dec. 29, 2016

(30) Foreign Application Priority Data

Jun. 25, 2015 (JP) .................. 2015-127919

(51) Int. Cl.
| F21S 8/02 | (2006.01) |
| F21V 8/00 | (2006.01) |
| F21Y 101/00 | (2016.01) |

(52) U.S. Cl.
CPC ............ F21S 8/026 (2013.01); G02B 6/0036 (2013.01); G02B 6/0076 (2013.01); F21Y 2101/00 (2013.01); G02B 6/009 (2013.01); G02B 6/0055 (2013.01); G02B 6/0065 (2013.01)

(58) Field of Classification Search
CPC .. G02B 6/0043; G02B 6/0055; G02B 6/0065; G02B 6/009; G02B 6/0036; G02B 6/0076; F21S 8/026; F21Y 2101/00

USPC .......................................................... 362/611
See application file for complete search history.

(56) References Cited

U.S. PATENT DOCUMENTS

2011/0109835 A1*  5/2011  Masuda ............ G02F 1/133606
                                                            349/61
2011/0188230 A1   8/2011  Lee et al.
2012/0140517 A1   6/2012  Sakamoto et al.

FOREIGN PATENT DOCUMENTS

| JP | 2000-162595 | 6/2000 |
| JP | 2004-228018 | 8/2004 |
| JP | 2010-257846 | 11/2010 |
| JP | 2011-003367 | 1/2011 |
| JP | 2012-502314 | 1/2012 |

* cited by examiner

*Primary Examiner* — Andrew J Coughlin
*Assistant Examiner* — Meghan K Ulanday
(74) *Attorney, Agent, or Firm* — Greenblum & Bernstein, P.L.C.

(57) ABSTRACT

An illumination device includes a light source unit; and a light guide plate configured to guide light from the light source unit and to emit the light outward. The light guide plate includes an incidence surface which constitutes one end surface of the light guide plate and on which the light from the light source unit is incident, and emission surfaces which constitute opposite main surfaces of the light guide plate and from which the light incident on the incidence surface is emitted. The emission surfaces include dots formed by micro prism processing. The dots on one of the emission surfaces and the dots on the other emission surface are position-shifted in rotational symmetry with each other.

6 Claims, 10 Drawing Sheets

ILLUMINATION DEVICE

CROSS-REFERENCE TO RELATED APPLICATIONS

This application claims priority to Japanese Patent Application No. 2015-127919, filed Jun. 25, 2015, the entire contents of which are hereby incorporated by reference.

TECHNICAL FIELD

The present disclosure relates to an illumination device provided with a light guide plate.

BACKGROUND ART

Conventionally, there is known an illumination device provided with a light guide plate which guides light emitted from a light source unit and emits the light outward (see, e.g., Japanese Unexamined Patent Application Publication No. 2011-3367). The light guide plate includes, for example, fine concave pattern marks (dots) disposed in a matrix shape on the opposite main surfaces (a front surface and a rear surface) thereof. The light is emitted outward through the dots. The dots are arranged in, for example, a square lattice pattern. The dots on the front surface are offset with respect to the dots on the rear surface in the arrangement direction of the square lattice. By disposing the dots in this way, the number of bright spots formed by the dots is increased, so that the light guide plate can uniformly emit light.

However, in the aforementioned illumination device, the dots on the front surface and the dots on the rear surface interfere with each other. Thus, when the light guide plate is viewed from the front surface side or the rear surface side, a periodic pattern of stripe-shape (moire) may be generated in some cases.

As one means for removing the moire, it is thinkable that the interference between the dots on the front surface and the dots on the rear surface is reduced by bonding light diffusion sheets to the front surface and the rear surface of the light guide plate or by adding a light diffusion property to a region where the dots are not formed. However, the addition of the light diffusion property makes it difficult to control the distribution of the light emitted from the light guide plate. Particularly, when the illumination device is turned off, the opacity of the light guide plate is noticeable and the appearance of the light guide plate is poor.

SUMMARY OF THE INVENTION

In view of the above, the present disclosure provides an illumination device provided with a light guide plate having a front surface and a rear surface on which dots are formed, the illumination device being capable of improving the appearance thereof, controlling light distribution with the light guide plate and suppressing generation of a moire.

In accordance with an aspect of the disclosure, there is provided an illumination device, including a light source unit; and a light guide plate configured to guide light from the light source unit and to emit the light outward. The light guide plate includes an incidence surface which constitutes one end surface of the light guide plate and on which the light from the light source unit is incident, and emission surfaces which constitute opposite main surfaces of the light guide plate and from which the light incident on the incidence surface is emitted. The emission surfaces include dots formed by micro prism processing. The dots on one of the emission surfaces and the dots on the other emission surface are position-shifted in rotational symmetry with each other.

According to the illumination device described above, it is possible to reduce the interference between the dots of one emission surface (front surface) and the dots of the other emission surface (rear surface) without adding a light diffusion property to the light guide plate. Thus, it is possible to make the light guide plate transparent, thereby improving the appearance of the light guide plate.

Furthermore, it is possible to control the light distribution with the light guide plate and to suppress generation of a moire.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Figure 1:
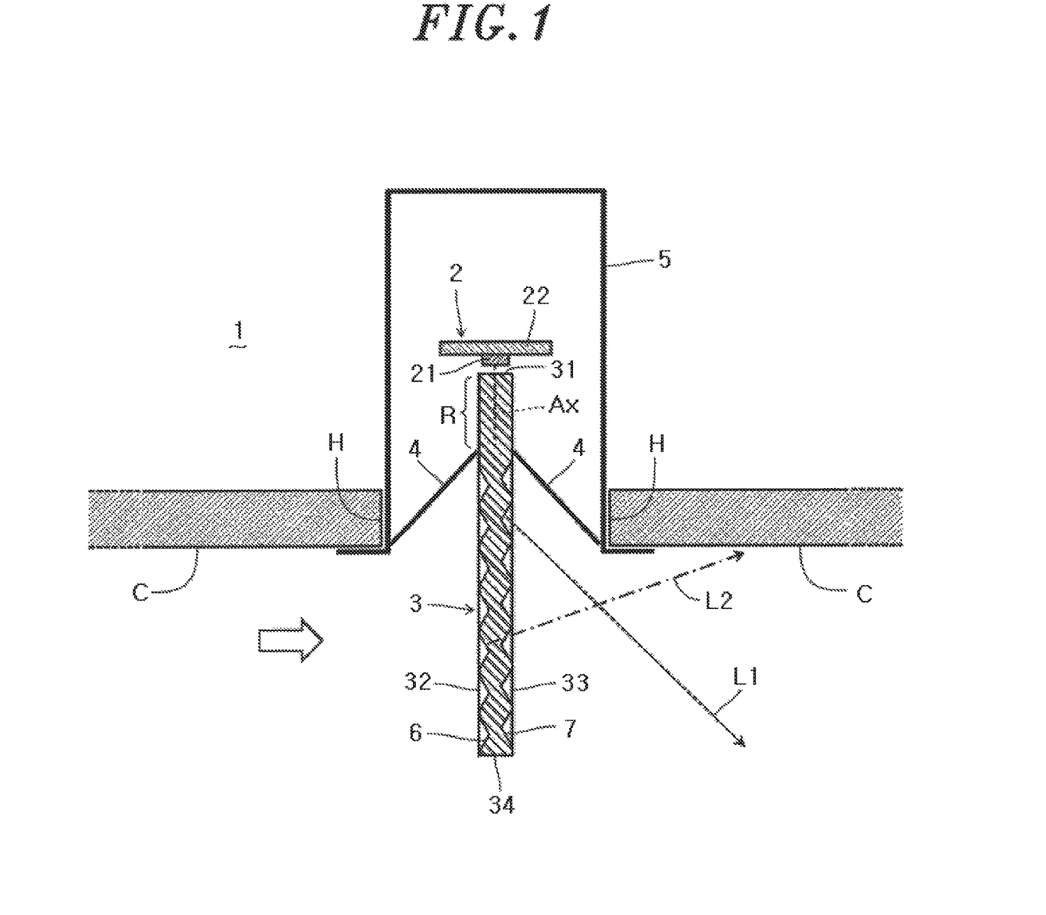
FIG. 1 is a side sectional view of an illumination device according to one embodiment.

An illumination device according to one embodiment will be described with reference to FIGS. 1 to 9B. As illustrated in FIG. 1, the illumination device 1 is embedded in a ceiling C. The illumination device 1 includes an light source unit 2, a light guide plate 3 configured to guide light from the light source unit 2 and to emit the light outward, a reflection plate 4 configured to reflect the light from the light guide plate 3 toward a floor surface (downward), and a case 5 configured to hold the light source unit 2, the light guide plate 3 and the reflection plate 4. The case 5 is formed of a frame embedded in a hole H provided in the ceiling C and is configured to hold the light source unit 2, the light guide plate 3 and the reflection plate 4 in a specified position using a holding structure (not shown).

The light source unit 2 includes LEDs 21 and a wiring board 22 on which the LEDs 21 are mounted. The LEDs 21 are provided in a plural number and are disposed in rows at regular intervals from the front side of a drawing sheet toward the back side thereof (see FIG. 2). The LEDs 21 are formed of, for example, white LEDs which emit white light. The LEDs 21 are mounted on wiring board 22 so that the optical axes Ax of the LEDs 21 extend in the vertical direction.

The light guide plate 3 is made of a transparent material such as a transparent acryl plate or the like and is formed in, for example, a rectangular flat plate shape of 600 mm in width, 90 mm in length and 4 mm in thickness. The light guide plate 3 includes an incidence surface 31 which constitutes one end surface of the light guide plate 3 and on which the light from the light source unit 2 is incident, and emission surfaces 32 and 33 which constitute opposite main surfaces of the light guide plate 3 and from which the light incident on the incidence surface 31 is emitted. The light guide plate 3 is disposed in a manner that the incidence surface 31 faces toward the LEDs 21 and the emission surfaces 32 and 33 are parallel to the optical axes Ax. The respective emission surfaces 32 and 33 are provided with dots 6 and 7 formed by micro prism processing, for controlling light distribution of emitted light.

The dots 6 and 7 are formed by micro prism processing to have the same size, shape and coverage. The dots 6 and 7 are formed in a substantially conical or substantially dome-like concave shape of 10 μm to 500 μm in diameter and 50 μm to 100 μm in depth by, for example, laser processing, cutting or injection molding using a mold having a convex shape. The coverage of the dots 6 and 7 on the emission surfaces 32 and 33 ranges from 10% to 50%, preferably 20%.

The dots 6 and 7 transmit or reflect the light emitted from the LEDs 21 and guided through the light guide plate 3, thereby emitting the light outward. The light emitted from the dots 6 and 7 include light L1 directed downward (toward the floor surface) and light L2 directed upward (toward the ceiling C).

The dots 6 and 7 are not disposed in a region R of the emission surfaces 32 and 33, in the vicinity of the LEDs 21, on which high brightness light from the LEDs 21 is incident. By doing so, in the region R, the light is mostly guided without being emitted. This makes it possible to suppress generation of uneven light emission in the region R. The region R is set to have a length of, for example, 20 mm. Furthermore, an end surface 34 of the light guide plate 3 opposite to the incidence surface 31 is subjected to blasting. By doing so, it is possible to diffuse the light emitted from the end surface 34.

The reflection plate 4 is disposed so as to extend between the light guide plate 3 and the case 5, at such an angle that the reflection plate 4 reflects the light emitted from the dots 6 and 7 downward. The reflection plate 4 is made of a material having high light reflectivity, for example, aluminum.

Figure 2:
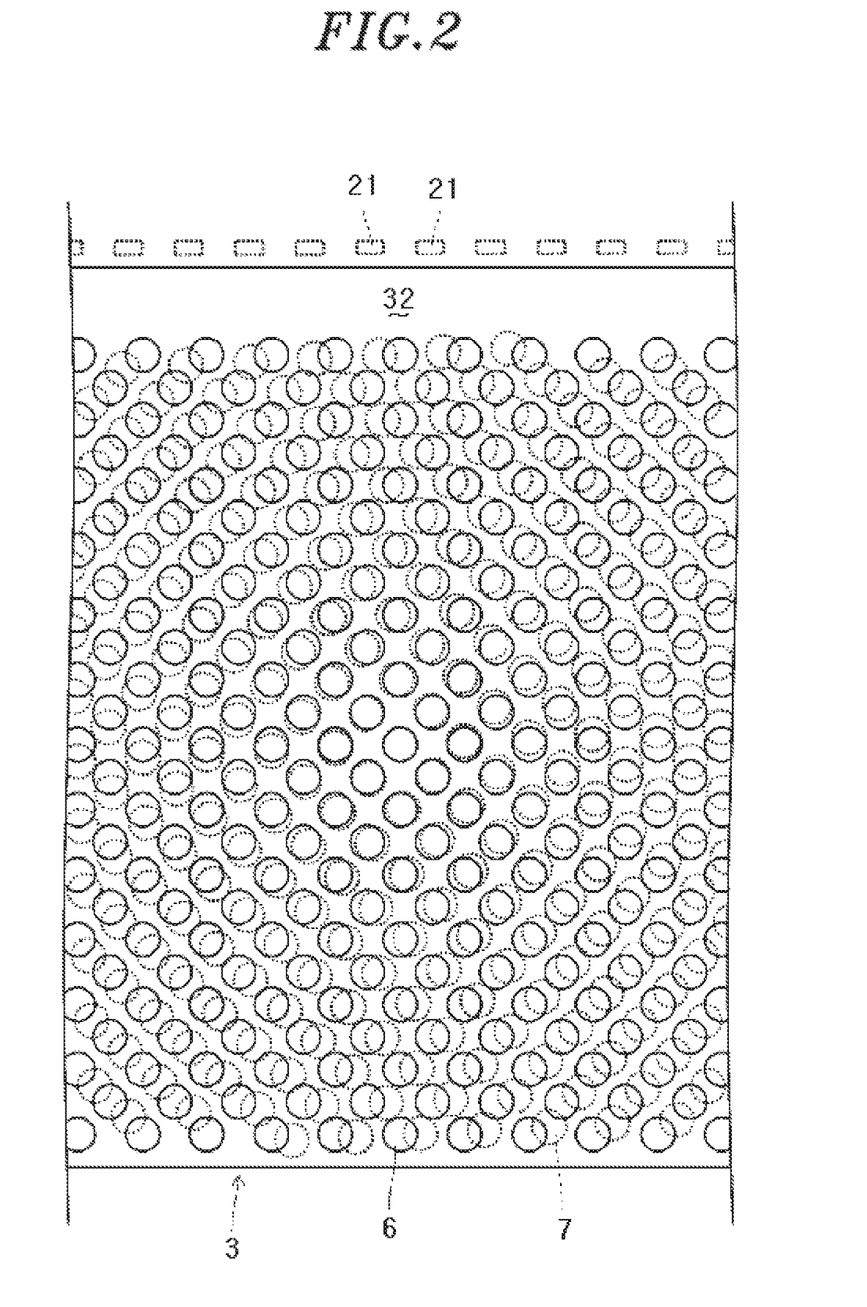
FIG. 2 is a view of a light guide plate of the illumination device, which is viewed in a direction indicated by an arrow in FIG. 1.
Figure 3A:
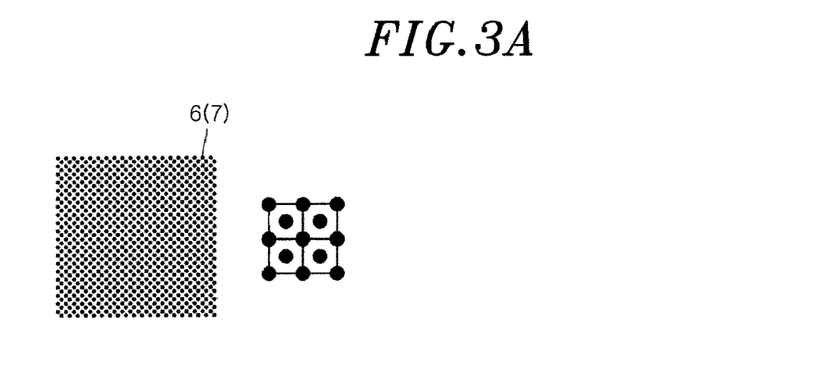
FIG. 3A is a view showing dots arranged in an oblique lattice pattern on the light guide plate.

As illustrated in FIG. 2, the dots 6 (indicated by solid lines) and the dots 7 (indicated by dot lines) have the same arrangement pattern. When the light guide plate 3 is viewed from the side of the emission surface 32, the dots 6 and the dots 7 are position-shifted in rotational symmetry with each other about the center of the light guide plate 3. As shown in FIG. 3A, the dots 6 and 7 have an arrangement pattern of, for example, an oblique lattice (rhombic lattice). Studies have been conducted as to how the moires generated by the interference of the dots 6 and 7 are changed depending on the rotation angle of the dots 7 with respect to the dots 6 when the dots 6 and 7 have such an arrangement pattern.

Figure 3B:
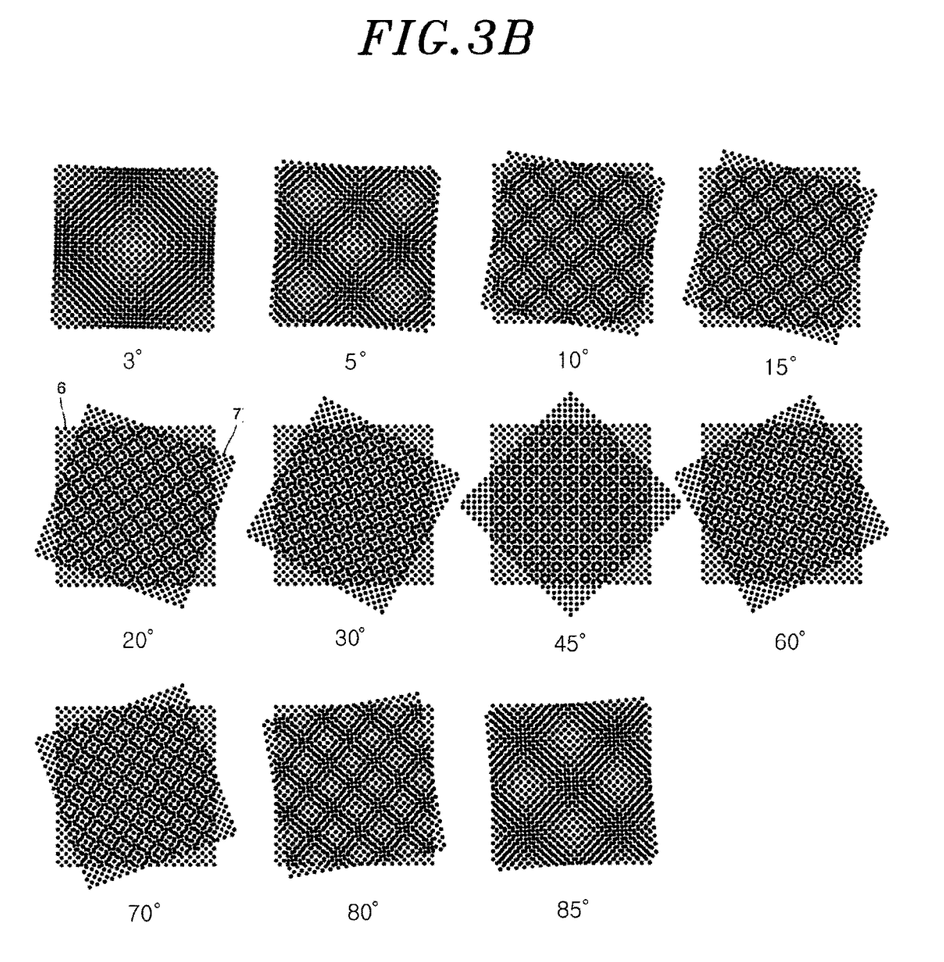
FIG. 3B is a view showing states in which the other side dots are rotated at different angles with respect to one side dots.

As illustrated in FIG. 3B, when the dots 7 was rotated 3 degrees with respect to the dots 6, a moire emerging in a circular shape was generated at the center of the dots 6 and 7. In this state, as the rotation angle of the dots 7 with respect to the dots 6 was increased to 5 degrees, 10 degrees, 15 degrees, 20 degrees and 30 degrees, the diameter of the moire (the moire diameter) gradually was decreased. In a range where the rotation angle was 30 degrees to 60 degrees, the moire diameter was not substantially changed. When the rotation angle was increased to 70 degrees or more, the moire diameter was increased again.

Figure 4:
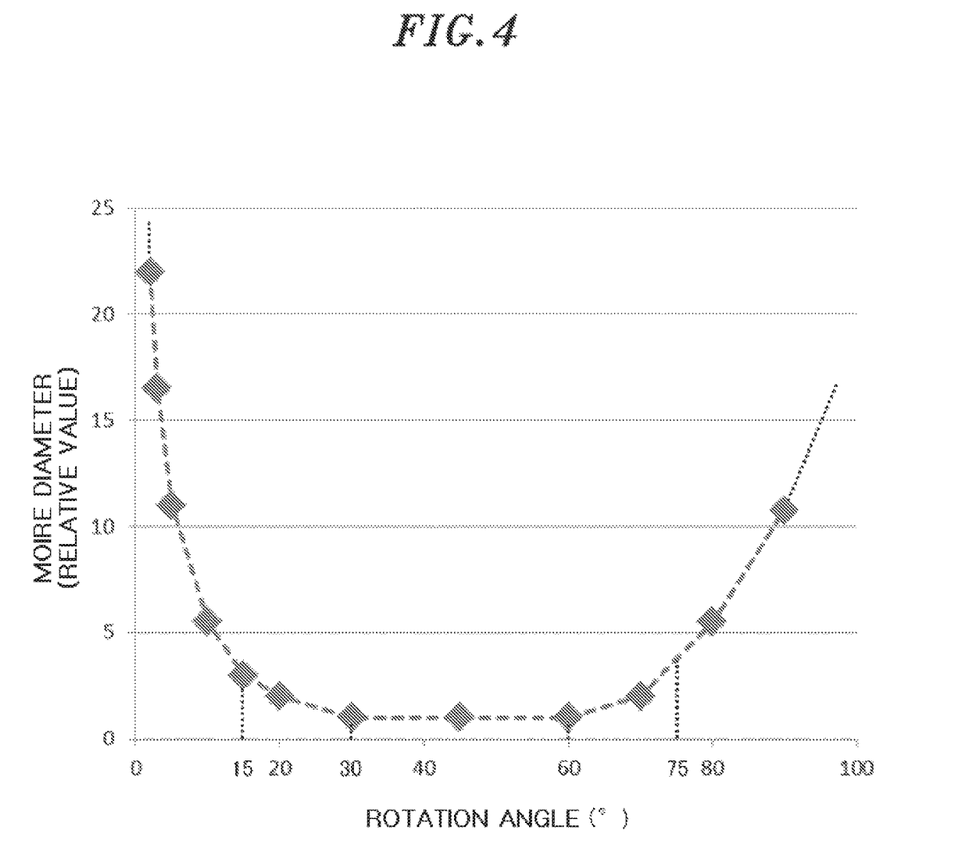
FIG. 4 is a view showing the relationship between the rotation angles shown in FIG. 3B and the diameter of moires generated at the rotation angles.
Figure 5:
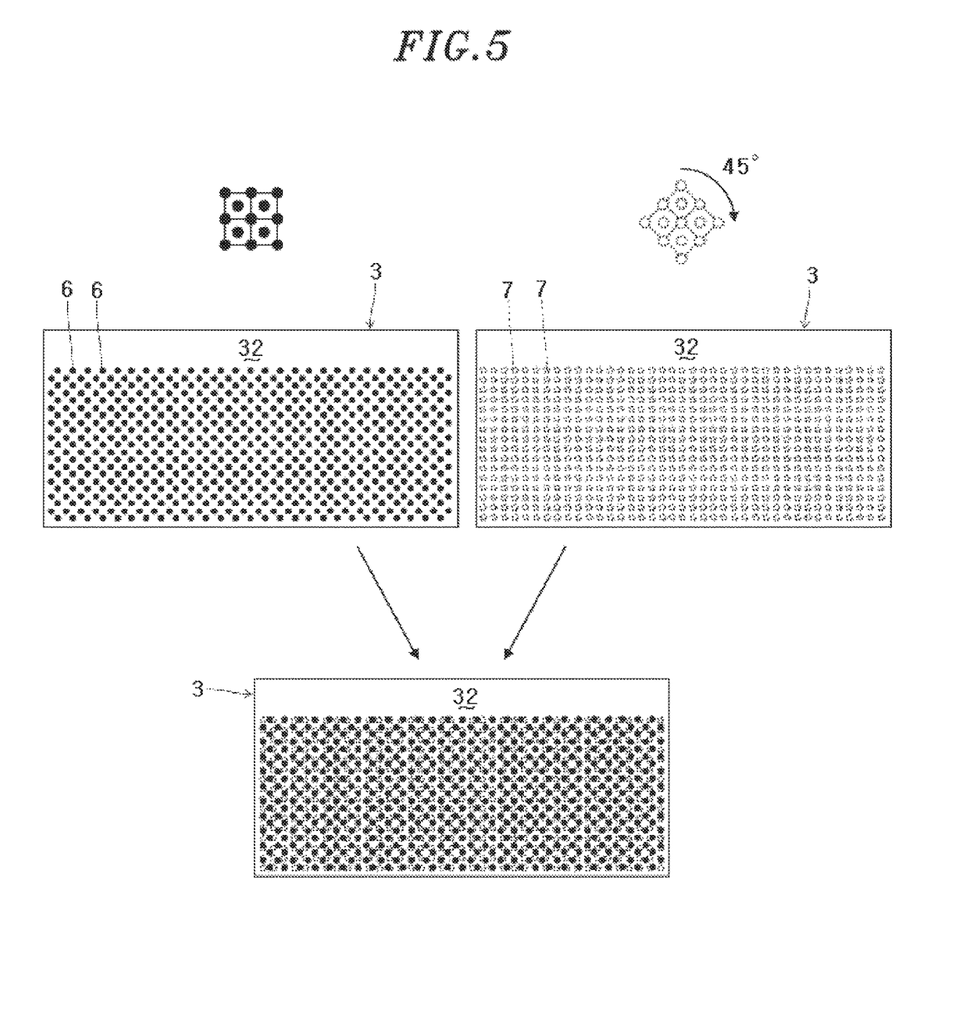
FIG. 5 is a view showing an arrangement pattern example of the dots.
Figure 6:
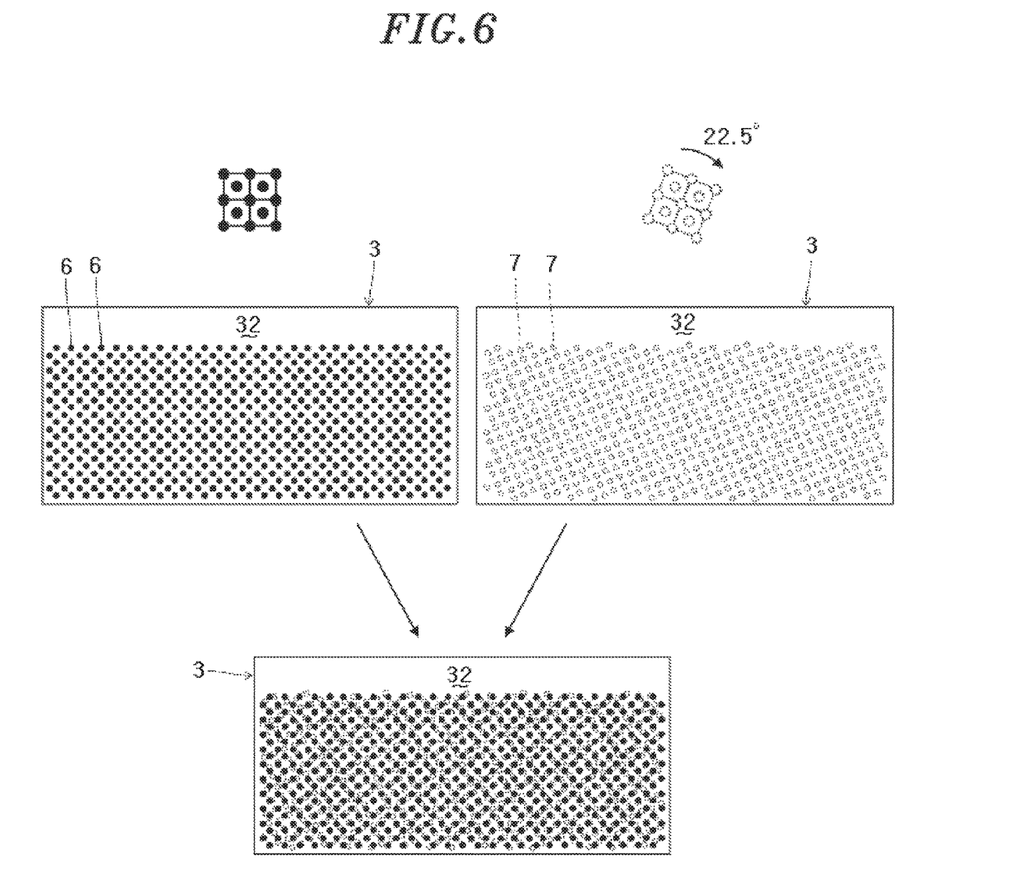
FIG. 6 is a view showing another arrangement pattern example of the dots.

As a result, it has been found that the moire diameter decreases when the dots 6 and 7 are position-shifted from each other at a rotation angle of 15 to 75 degrees, preferably 30 to 60 degrees, as shown in FIG. 4. Thus, as illustrated in FIG. 5, the light guide plate 3 was configured such that, when the light guide plate 3 is viewed from the side of the emission surface 32 (or the emission surface 33), the dots 6 and 7 are in rotational symmetry of 45 degree with each other. By doing so, it is possible to suppress generation of moires attributable to the interference of the dots 6 and 7 and to improve the appearance of the light guide plate 3. The same effects could be achieved when the dots 7 are rotated 22.5 degrees with respect to the dots 6 as illustrated in FIG. 6.

Figure 7A:
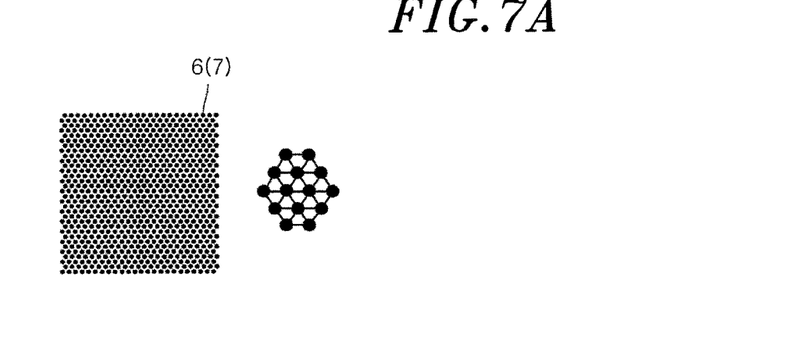
FIG. 7A is a view showing dots arranged in an equilateral triangle lattice pattern on the light guide plate.
Figure 7B:
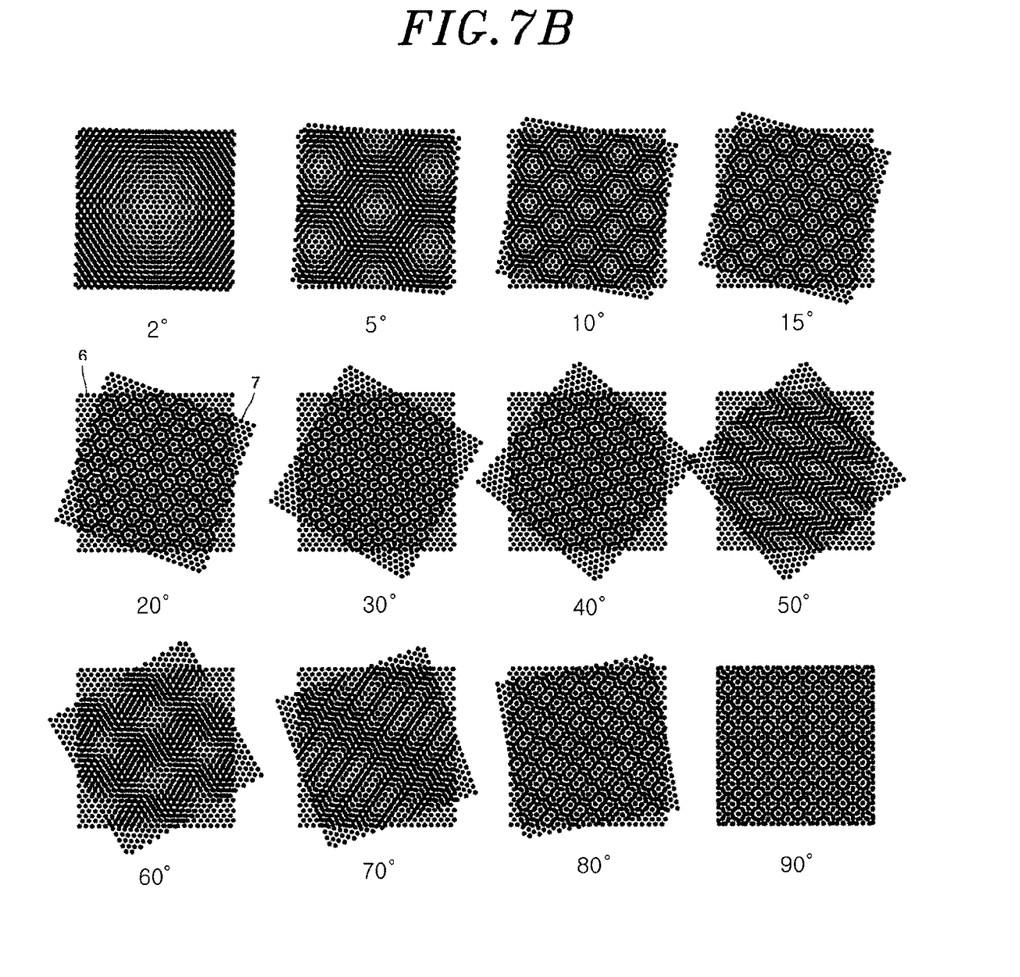
FIG. 7B is a view showing states in which the other side dots are rotated at different angles with respect to one side dots.

Next, studies have been conducted on a case where the dots 6 and 7 have an arrangement pattern formed of an equilateral triangle lattice (hexagonal lattice) as illustrated in FIG. 7A. As a result, as illustrated in FIG. 7B, the moire diameter was gradually decreased as the rotation angle of the dots 7 with respect to the dots 6 was increased to 2 degrees, 2 degrees, 5 degrees, 10 degrees and 15 degrees. In a range where the rotation angle was 20 degrees to 40 degrees, the moire diameter was not substantially changed. Then, the moire diameter was gradually increased as the rotation angle was increased to 50 degrees and 60 degrees. Conversely, the moire diameter was decreased as the rotation angle was increased to 70 degrees, 80 degrees and 90 degrees.

Figure 8:
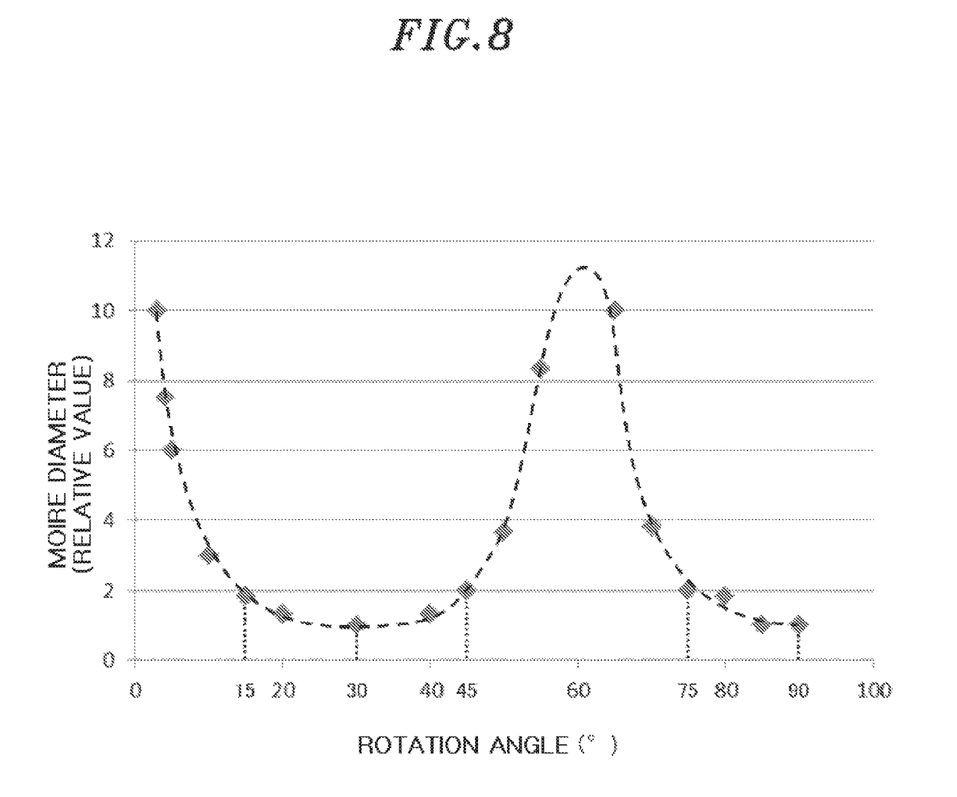
FIG. 8 is a view showing the relationship between the rotation angles shown in FIG. 7B and the diameter of moires generated at the rotation angles.

Summarizing the above results in FIG. 8, the moire diameter decreases when the dots 6 and 7 are position-shifted from each other at a rotation angle of 15 to 45 degrees or 75 to 90 degrees, preferably 30 degrees or 90 degrees. By controlling the rotation angle of the dots 7 with respect to the dots 6 in this way, it is possible to suppress generation of moires attributable to the interference of the dots 6 and 7 and to improve the appearance of the light guide plate 3.

Figure 9A:
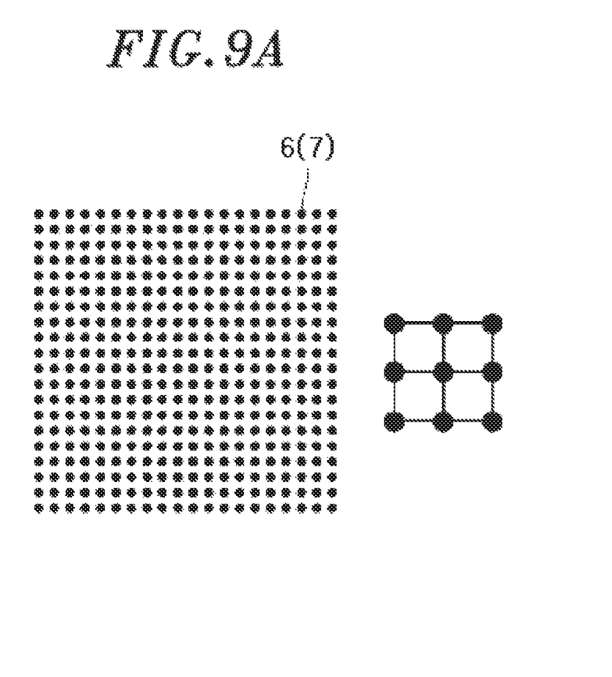
FIG. 9A is a view showing dots arranged in a square lattice pattern on the light guide plate.
Figure 9B:
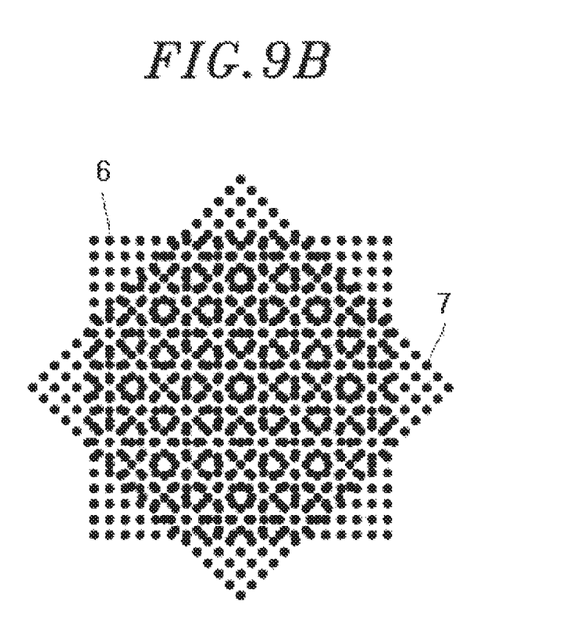
FIG. 9B is a view showing a state in which the other side dots are rotated at 45 degrees with respect to one side dots.

Next, studies have been conducted on a case where the dots 6 and 7 have an arrangement pattern formed of a square lattice as illustrated in FIG. 9A. As a result, the moire diameter was decreased when the dots 6 and 7 were in rotational symmetry of 15 to 75 degrees with each other, more preferably when the dots 6 and 7 were in rotational symmetry of 45 degrees with each other as illustrated in FIG. 9B. The same results could be obtained even when the dots 6 and 7 have an arrangement pattern formed of a rectangular lattice.

As described above, according to the illumination device 1 of the present disclosure, it is possible to reduce the interference between the dots 6 on the emission surface 32 and the dots 7 on the emission surface 33 without adding a light diffusion property to the light guide plate 3. Thus, it is possible to make the light guide plate 3 transparent, thereby improving the appearance of the light guide plate 3. Furthermore, it is possible to control the light distribution with the light guide plate 3 and to further suppress generation of a moire attributable to the interference of the dots 6 and 7.

Since the dots 6 and 7 have the same size, shape, coverage and arrangement pattern, it is possible to equalize the light distributions of the light emitted from the emission surface 32 and the light emitted from the emission surface 33. Furthermore, the dots 6 and 7 have the same arrangement pattern. Therefore, as compared with a case where the dots are randomly disposed, it is possible to simply form the dots and to shorten the work time required in forming the dots. Moreover, there is no need to use an expensive apparatus capable of randomly disposing dots. It is therefore possible to save the manufacturing cost.

In the illumination device 1, the dots 6 and 7 have the same arrangement pattern but differ in the arrangement direction of the arrangement pattern from each other. For that reason, when observing the dots 6 and 7 (on the emission surfaces 32 and 33) of the light guide plate 3, a user may feel that the dots differ between the emission surfaces 32 and 33. Furthermore, when the dots 6 and 7 are formed by laser processing or injection molding, it is necessary to form the dots 6 and 7 using different processing patterns or molds.

Figure 10A:
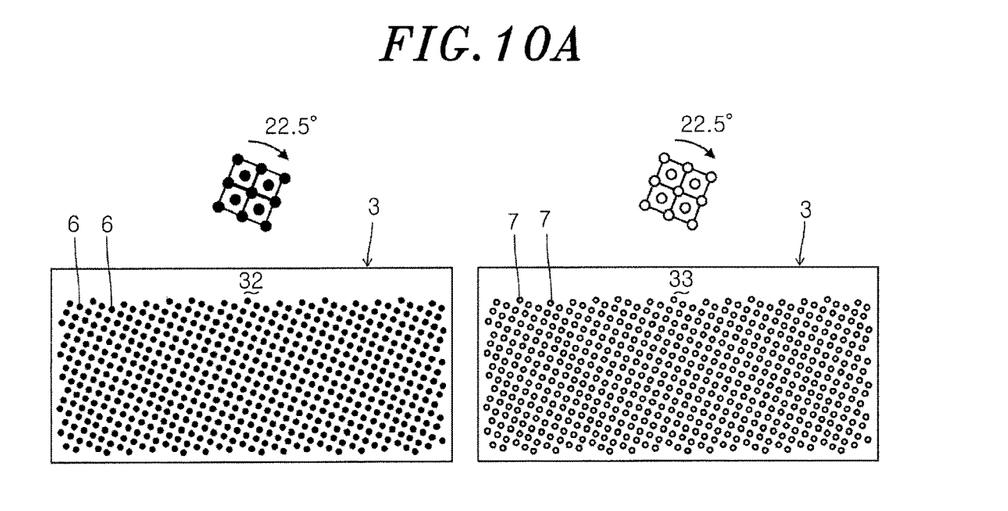
FIGS. 10A and 10B are views showing arrangement pattern examples of dots in an illumination device according to another embodiment.
Figure 10B:
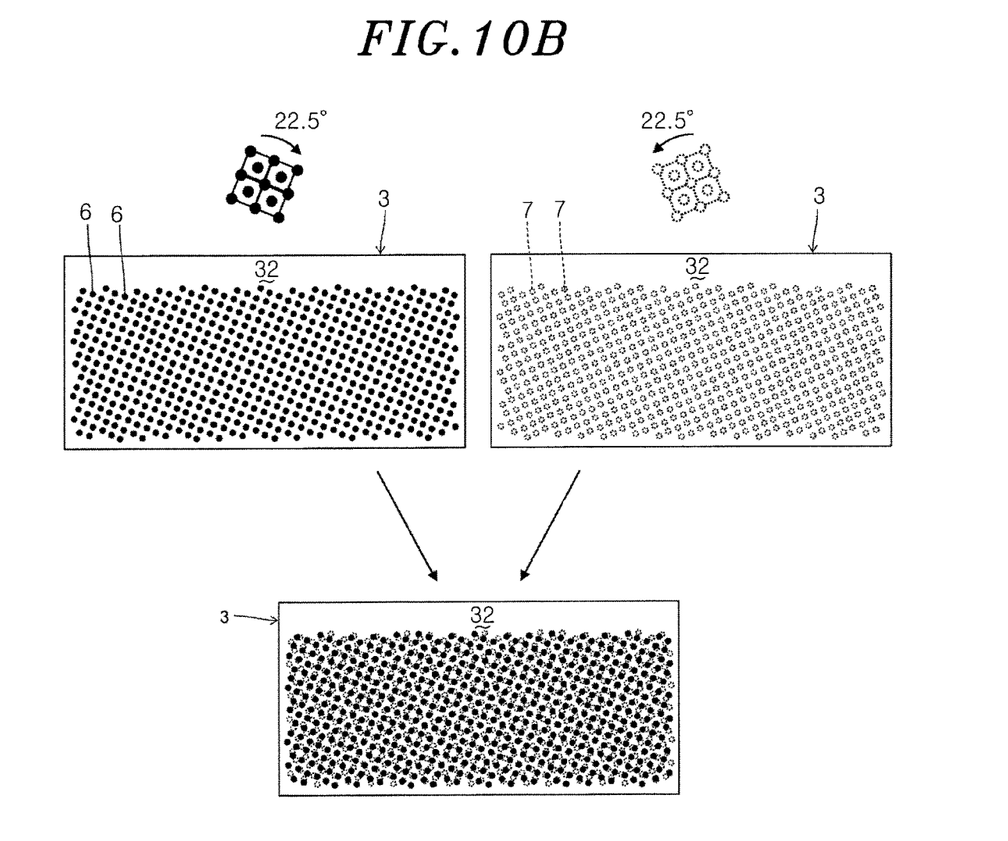

Thus, in an illumination device according to another embodiment, as illustrated in FIGS. 10A and 10B, the dots 6 and 7 have the same arrangement pattern and have mirror images when the light guide plate 3 is viewed from the side of the emission surface 32 (see FIG. 10B). In the illustrated example, the dots 6 and 7 have an arrangement pattern of an oblique lattice shape inclined at 22.5 degrees. The dots 6 and 7 have the same arrangement when viewed from the side of each of the emission surfaces 32 and 33 (see FIG. 10A) but have mirror images having rotational symmetry of 45 degrees with each other when viewed from the side of the emission surface 32. The rotation angle of the dots 7 with respect to the dots 6 is not limited to 45 degrees but may be appropriately determined in view of generation condition of a moire, workability of the dots 6 and 7, or the like.

By doing so, it is possible to further achieve the following effects in addition to the effects achieved by the aforementioned illumination device 1. Since the dots 6 and have the same arrangement pattern and the arrangement direction, it is possible to eliminate a difference in the dot feeling between the emission surfaces 32 and 33. Thus, for example, when a plurality of illumination devices is disposed so that the light guide plates 3 thereof face toward a user, the user will not feel a sense of discomfort even if the user views the coexisting emission surfaces 32 and 33. Furthermore, when the dots 6 and 7 are formed by laser processing or injection molding, it is possible to form the dots 6 and 7 using the same processing pattern or the same mold. This makes it possible to shorten the work time to save the manufacturing cost.

The illumination device according to the present disclosure is not limited to the aforementioned embodiments but may be modified in many different forms. For example, the dots need not necessarily have a predetermined arrangement pattern but may be randomly disposed as long as the dots are in rotational symmetry with each other. Furthermore, the dots are not limited to the concave shape but may be formed in a convex shape by, for example, inkjet printing or injection molding. Moreover, the dots need not necessarily have the same dot diameter. For example, the dot diameter may be made small at the side closer to the light source unit and may be made large at the side distant from the light source unit. By doing so, it is possible to improve the light emission efficiency at the side distant from the light source unit and to prevent brightness from decreasing in the end portion of the light guide plate distant from the light source unit. This diameter difference in the dots is particularly effective in the case where the light guide plate is elongated in the light guide direction. In addition, it is not necessarily required that the dots are position-shifted in rotational symmetry about the center of the light guide plate. The dots may be position-shifted in rotational symmetry about an arbitrary position.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination device, comprising:
   a light source; and
   a light guide plate configured to guide light from the light source and to emit the light outward,
   wherein the light guide plate includes an incidence surface which is one end surface of the light guide plate and on which the light from the light source is incident, and emission surfaces which are opposed main surfaces of the light guide plate and from which the light incident on the incidence surface is emitted,
   wherein the emission surfaces include micro prism processed dots,
   wherein the dots on one of the emission surfaces and the dots on the other of the emission surfaces are position-shifted in rotational symmetry with respect to each other about an arbitrary position, and
   wherein the dots on one of the emission surfaces and the dots on the other of the emission surfaces are mirror images with respect to each other.

2. The device of claim 1, wherein the dots on one of the emission surfaces and the dots on the other emission surface have the same arrangement pattern.

3. The device of claim 2, wherein the dots have an arrangement pattern comprising an oblique lattice, a square lattice or a rectangular lattice, and the dots on one of the emission surfaces and the dots on the other of the emission surfaces are in rotational symmetry of 15 to 75 degrees with respect to each other.

4. The device of claim 3, wherein the dots on one of the emission surfaces and the dots on the other of the emission surfaces are in rotational symmetry of 45 degrees with respect to each other.

5. The device of claim 2, wherein the dots have an arrangement pattern comprising an equilateral triangle lattice, and
   the dots on one of the emission surfaces and the dots on the other of the emission surfaces are in rotational symmetry of 15 to 45 degrees or 75 to 90 degrees with respect to each other.

6. The device of claim 5, wherein the dots on one of the emission surfaces and the dots on the other of the emission surfaces are in rotational symmetry of 30 degrees or 90 degrees with respect to each other.

* * * * *